United States Patent
Yamazaki et al.

(10) Patent No.: US 6,351,788 B1
(45) Date of Patent: Feb. 26, 2002

(54) DATA PROCESSOR AND DATA PROCESSING SYSTEM

(75) Inventors: Takanaga Yamazaki, Tama; Yasushi Akao, Kokubunji; Keiichi Kurakazu, Tokorozawa; Masayasu Ohizumi, Akishima; Takeshi Kataoka, Tokyo; Tatsuo Nakai, Kodaira; Mitsuhiro Miyazaki, Higashimurayama; Yosuke Murayama, Kodaira, all of (JP)

(73) Assignees: Hitachi, Ltd.; Hitachi ULSI Systems Co., Ltd., both of Tokyo (JP)

( * ) Notice: Subject to any disclaimer, the term of this patent is extended or adjusted under 35 U.S.C. 154(b) by 0 days.

(21) Appl. No.: 09/297,310

(22) PCT Filed: Oct. 30, 1996

(86) PCT No.: PCT/JP96/03172

§ 371 Date: Jun. 10, 1999

§ 102(e) Date: Jun. 10, 1999

(87) PCT Pub. No.: WO98/19242

PCT Pub. Date: May 7, 1998

(51) Int. Cl.$^7$ ............................................... G06F 13/00
(52) U.S. Cl. ............................ 711/119; 711/118; 711/3; 711/120; 711/121; 711/122; 711/123
(58) Field of Search ............................ 711/3, 118–123, 711/133, 128

(56) References Cited

U.S. PATENT DOCUMENTS

| | | | | |
|---|---|---|---|---|
| 5,276,851 A | * | 1/1994 | Thacker et al. | 711/120 |
| 5,809,562 A | * | 9/1998 | Gaskins et al. | 711/207 |
| 6,122,711 A | * | 9/2000 | Mackenthun et al. | 711/135 |

FOREIGN PATENT DOCUMENTS

| | | | |
|---|---|---|---|
| JP | 54-60833 | * | 5/1979 |
| JP | 55-8628 | | 1/1980 |
| JP | 58-14391 | * | 1/1983 |
| JP | 62-135944 | * | 6/1987 |
| JP | 62-145341 | | 6/1987 |
| JP | 62-276644 | | 12/1987 |
| JP | 2-188847 | * | 7/1990 |
| JP | 4-49446 | | 2/1992 |
| JP | 5-120133 | | 5/1993 |
| JP | 6-231044 | | 8/1994 |
| JP | 8-263377 | * | 10/1996 |

OTHER PUBLICATIONS

Nikkei Electronics, Feb. 14, 1994, No. 601, RISC chip SH7604 directly connectable to a synchronous DRAM, J. Hasegawa et al.

* cited by examiner

*Primary Examiner*—Than Nguyen
(74) *Attorney, Agent, or Firm*—Mattingly, Stanger & Malur, P.C.

(57) ABSTRACT

A data processor including a central processing unit and a plurality of direct map cache memories (3, 4) has a plurality of area designating circuits (5, 6) for variably designating location and size of address area in the memory space managed the central processing unit and partially overlaps the address area designated by a plurality of area designating circuits. Thereby, the overlapped area (Eco) has a function as the 2-way set associative cache memory in combination with a plurality of cache memories. For the non-overlapping area, respective cache memory functions as the direct map cache memory. It is previously judged to attain the necessary data processing capability by arranging which processing routine to which address area and then executing such routine with what processing speed. Thereby, when cache object area is assigned to a plurality of cache memory, a plurality of cache memories are combined as a set associative cache for operation to the task which particularly requires high speed operation or to the data. As a result, the system can be optimized by improving the cache hit rate of the necessary area.

12 Claims, 5 Drawing Sheets

DATA PROCESSOR AND DATA PROCESSING SYSTEM

TECHNICAL FIELD

The present invention relates to a data processor including cache memories and particularly to technique for easily changing structure of cache memory or function thereof depending on the requested specification, for example, technique which is effectively applied to an RISC (Reduced Instruction Set Computer) for controlling the built-in devices.

BACKGROUND ART

Almost all data processors having the RISC architecture employ the pipeline technique to execute in virtual one instruction in one clock cycle (one pipeline stage) to realize high speed data processing and moreover are loading cache memories to realize high speed access of operands and instructions. Such RISC processor is described, for example, on pages 79 to 92 of the Nikkei Electronics, No. 601 (issued on Feb. 14, 1994 by Nikkei PB).

As is described in above reference, cache mistake of cache memory is correlated with cache memory size and cache line size.

Moreover, type of cache memory is divided to the direct map or set associative structure. The direct map selects cache line using a part of the significant bit side of the given address signal as an index address and compares the cache tag included in the selected cache line with the remaining bits of the significant bit side of the address signal. When these are matched, the direct map uses the data included in the selected cache line. In the set associative structure, the direct map structures are arranged in parallel to provide a plurality of cache lines in one index address and the cache hit rate thereof is considered higher than that of the direct map structure because of its property.

Whether the direct map or set associative should be used as the structure of a cache memory and what capacity the cache memory should have are often determined depending on the application field of the data processor comprising cache memories. Particularly, since it may also be required to load particular peripheral circuit modules depending on the requested specifications in such a field as controlling the loading of the devices, it is preferable to minimize the chip occupation area required by cache memories. Moreover, it is sometimes required to consider the power consumption of cache memories.

According to discussion by the inventors of the present invention about the cache memories comprised in the data processor, on the occasion of offering products of data processor which is loading cache memories of 4-way set associative structure of 4K bytes in total, it is substantially impossible to change, in view of reducing chip size, the relevant cache memories for independent use as the cache memories of the direct map by separating a part of way from the investigated design data (data of module library) of such cache memories and therefore total design change of cache memories is inevitably required. In addition, the set associative type cache memories operate simultaneously a plurality of ways, such cache memories require higher power consumption in comparison with the direct map.

Moreover, the cache memory of the direct map corresponding to capacity of one way of the cache memory of 4-way set associative type is naturally smaller in the chip occupation area and power consumption in comparison with the set associative type but is reduced in the cache hit rate. Even when it is attempted to increase the capacity of cache memory in the product of data processor comprising such cache memory of the direct map type, it is impossible to simply increase the storage capacity and it is also required to establish the total re-design of the cache memory.

The inventors of the present invention have proved that there are problems that the array of cache line of the original cache memory must be re-designed and it is not easy to provide a product of the data processor comprising cache memory in order to increase or decrease the capacity of original cache memory or to change the structure of cache to the set associative type from direct map type or vice versa at the time of offering a product of the data processor comprising cache memory.

Moreover, regarding the cache memory, the technique for assigning cache memory corresponding to the logical page of virtual memory or property of task under the multi-user or multi-task system is described, for example, in the Japanese Published Unexamined Patent Application Nos. SHO 55-8628(1980), SHO 62-276644(1987), HEI 4-49446 (1992) and SHO 62-145341(1987). This technique is not intended to utilize as much possible the design resource of cache memory for changing the function or structure of the comprised cache memory on the occasion of offering a product of the data processor as explained above. The cache memory corresponding to logical page and task or the like is only the intrinsic one cache memory and does not have a means for easily changing the function or structure of the cache memory.

It is therefore an object of the present invention to offer a data processor which can change functions of the comprised cache memories under the condition that it is loaded to a system.

It is another object of the present invention to offer the technique for easily changing function or structure of cache memory in order to provide a product of the data processor comprising cache memory.

It is further object of the present invention to provide a data processor and a data processing system which can easily optimize the data processing capability and power consumption from the point of view of function and structure of the cache memory.

The aforementioned and further objects and novel features of the present invention will become apparent from the following description of the present specification.

DISCLOSURE OF THE INVENTION

The data processor of the present invention comprises a central processing unit, a plurality of area designating means for variably designating location and size of address area in the memory space to be managed by the central processing unit, detecting means provided corresponding respective area designating means to detect the access by the central processing unit to the address area designated by the relevant area designating means, a plurality of cache memories provided corresponding to individual means among a plurality of detecting means through the coupling with the central processing unit via the internal bus and a cache control means for controlling respective cache memories on the basis of the determination result of cache hit/mistake of cache memory and detection result of the access detecting means. For example, this data processor is formed on one semiconductor substrate.

The number of cache memories to be employed to the data processor of the present invention is determined freely within the range which is allowed by the chip occupation area. Logic of cache controller is changed only a little depending on the number of cache memories to be employed. Therefore, when the data processor is produced as the product (comprised circuits are added or functions of comprised circuits are changed depending on the specifications requested by users), address array or data array forming the cache line of the cache memory is never newly designed from the beginning.

Moreover, since address range for functioning individual cache memory can be varied, the cache memory can be functioned for each address area of, for example, every task or a group of tasks. Therefore, such a condition that cache mistake occurs continuously at the time of switching the task can be eliminated and data processing efficiency can be improved by utilizing the capability of cache memory to the largest extent. Such operation is never frozen by hardware. In other words, the cache memory to be used as the program area of task can be varied depending on the setting of the area designating means. Accordingly, assignment of cache memory can easily be optimized for the relevant system at the time of producing the data processor as the product to be applied for controlling the comprised devices. Assignment of such areas can also be applied to data area or the like used for each task.

The area designating means is provided with a register means for designating location and size of the address area and the central processing unit can set the relevant register means depending on its operation program. The task and data block for assigning the cache memory can be varied under the loading condition to the system or by the operation program executed by the software, namely CPU.

Unless otherwise specified particularly, a plurality of area designating means are capable of designating the location of address area through mutual overlapping. When individual cache memory is of the direct map type, a plurality of cache memories to which the overlapped address areas are set are functioning substantially in the same manner as the cache memory of set associative type in the area where the address areas are overlapped. When individual cache memories are of the n-way set associative type, the m cache memories to which overlapped address areas are set functions substantially in the same manner as the cache memories of (m×n)-way set associative type in the area where the address areas are overlapped. As explained above, when the areas are designated to partially overlap the address areas, functions of a plurality of cache memories can be varied to improve the cache hit efficiency. Moreover, such function can also be determined depending on the software as explained above. It is previously determined which processing routine should be located at which address area and necessary data processing capability should be obtained by executing such routine in which processing rate and when the cache object area is assigned for a plurality of cache memories, a plurality of cache memories are combined to operate as the set associative cache for the task which particularly requires higher processing rate or data area. Thereby, the system can be optimized by improving the cache hit rate of the necessary areas.

The cache memory explained above outputs the data in relation to hit to the internal bus depending on the cache hit condition. The cache control means explained above performs, to one cache memory, the cache filling operation to add the data relation to mistake to the cache line as a new entry when cache mistake of cache memory occurs. Therefore, when area designation is overlapped for a plurality of cache memories, the cache hit condition determined in individual cache memory is exclusively obtained in one cache memory. A plurality of cache memories does not determine the cache hit condition in parallel.

When one detecting means has detected access to the designated address area by the central processing unit, if the cache memory corresponding to such detecting means has generated a cache mistake, the cache control means performs the cache filling operation for the cache memory corresponding to such detecting means.

When a plurality of detecting means has detected access by the central processing unit to the designated address area, if all cache memories corresponding to such detecting means have occurred a cache mistake, the cache control means performs the cache filling operation to any one cache memory.

If the index operation and cache hit/mistake determining operation of cache memory are enabled when the corresponding detecting means has detected access to the designated address area, power consumption required by the cache line selecting operation can be reduced for a plurality of cache memories as a whole.

When the cache memory is enabled to operate by detecting access by the central processing unit to the designated address area by the corresponding detecting means, if the cache hit/mistake determination result is cache hit, a buffer means can output data to the internal bus from the data area of the cache line in relation to the cache hit.

BEST MODE FOR CARRYING OUT THE INVENTION

Figure 1:
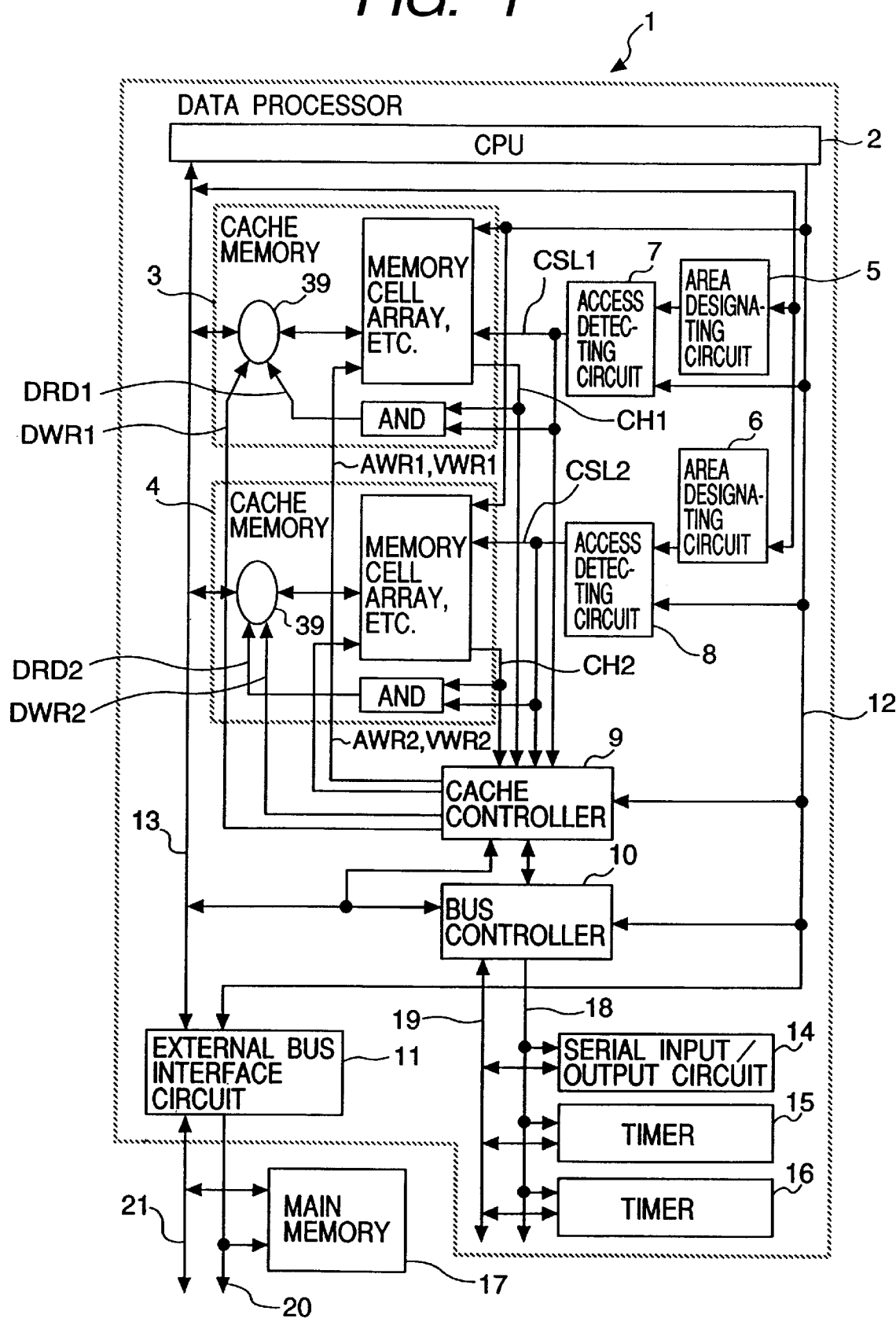
FIG. 1 is a block diagram of a data processor in relation to an embodiment of the present invention.

FIG. 1 illustrates a block diagram of a data processor in relation to an embodiment of the present invention. The data processor 1 illustrated in FIG. 1 is formed, although not particularly restricted, on one semiconductor substrate such as a single crystal silicone by the well known semiconductor integrated circuit manufacturing technique.

In FIG. 1, reference numeral 2 designates a central processing unit (abbreviated as CPU); 3, 4 designate cache memory; 5, 6, area designating circuit; 7, 8, access detecting circuit; 9, cache controller; 10, bus controller; 11, external bus interface circuit, which are all connected in common to the address bus 12 and data bus 13.

CPU2 has, although its details are not illustrated, an instruction control section and an arithmetic operation executing section. The instruction control section fetches an instruction to an instruction register depending on a value of program counter to decode the fetched instruction and generate various control signals required for execution of instruction. The arithmetic operation executing section fetches an operand to the internal register depending on the control signals generated by the instruction control section to execute the operations designated by the instruction code. Execution result is stored in the memory or loaded to the register as required. When the data processor has the RISC architecture, the instruction control section and arithmetic operation executing section execute the instruction in the pipeline format. Flow control of pipe line is executed by the instruction executing section.

The area designating circuits 5, 6 explained above can variably designate location and size of the address area in the memory space managed by CPU2. The access detecting circuits 7, 8 explained above are provided corresponding to the area designating circuits 5, 6 in order to detect access by CPU2 to the address area designated in the relevant area designating circuits 5, 6. CSL1, CSL2 are detecting signals output from the access detecting circuits 7, 8. These signals CSL1, CSL2 are set, for example, to high level (enable) when access is detected.

The cache memories 3, 4 explained above are provided, for example, on one to one basis in the access detecting circuits 7, 8. CH1, CH2 are hit signals indicating the cache hit/mistake determination result of the cache memories 3, 4 and these signals are set to high level (enable) depending on the cache hit condition.

The cache controller 9 explained above has a logic to control respective cache memories 3, 4 based on the bit signals CH1, CH2 and access detection signals CSL1, CSL2, etc. When the bus controller 10 controls, when CPU2 or the like requires external access, external bus access cycle via an external bus interface circuit 11. This bus controller 10 is connected to the cache controller 9 to drive the external bus cycle required by the cache controller 9 to acquire the data in relation to the relevant cache mistake from external circuits because of the cache mistake.

Although not particularly restricted, the data processor 1 has a serial input circuit 14 and timers 15, 16, etc. as the peripheral circuits connected to the peripheral address bus 18 and peripheral data bus 19 and these circuits are interfaced with CPU2 via the bus controller 10. The external bus interface circuit 11 is connected with an external address bus 20 and an external data bus 21. As an external device connected to both buses 20, 21, a main memory 17 formed of DRAM (Dynamic Random Access Memory) or SRAM (Static Random Access Memory) is typically illustrated.

Figure 3:
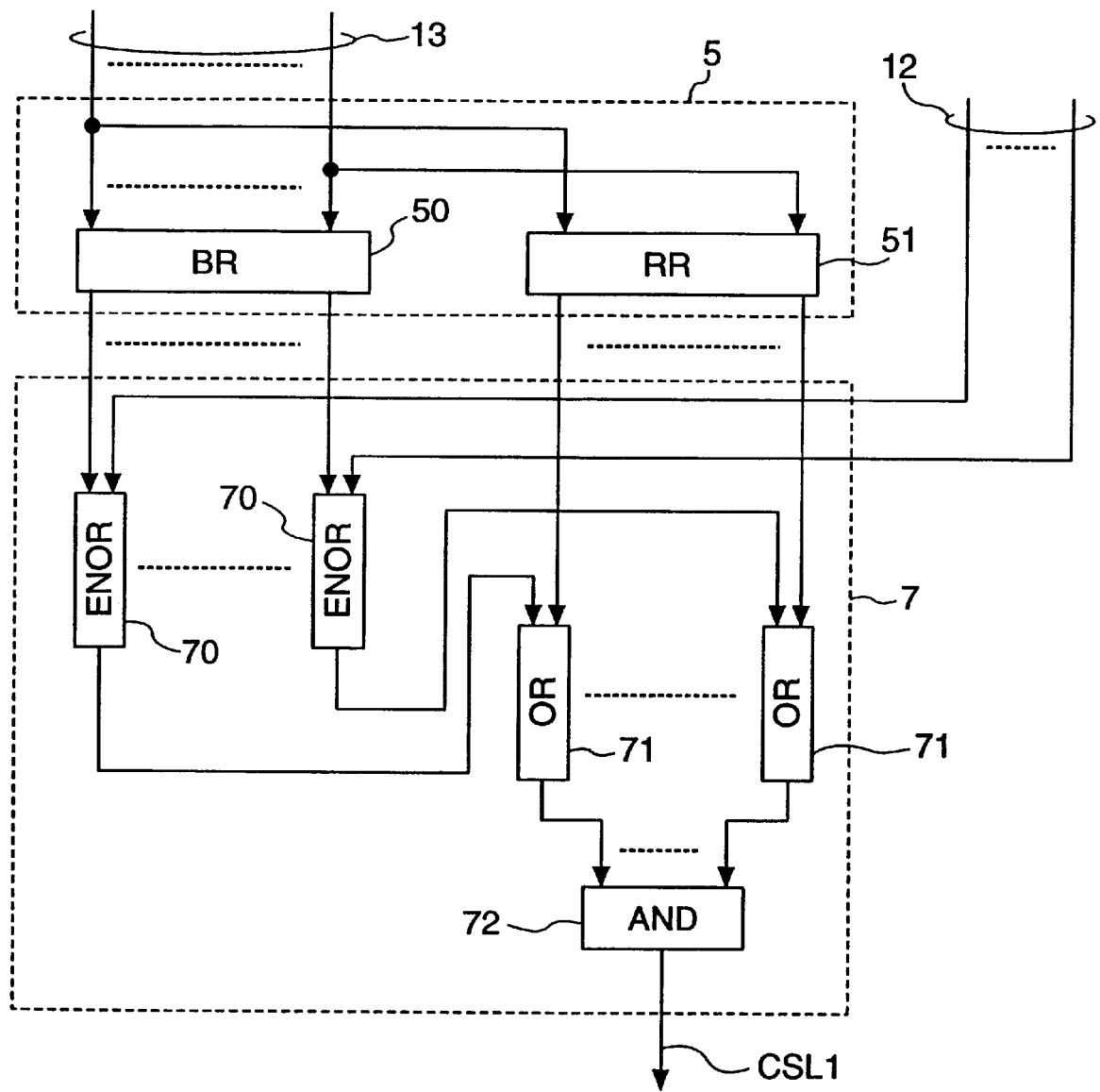
FIG. 3 is a block diagram of an example of an area designating circuit and an access detecting circuit.

FIG. 3 illustrates an example of the area designating circuit 5 and access detecting circuit 7.

The area designating circuit 5 has a base register (BR) 50 and a range register (RR) 51. Respective registers 50, 51 can freely set the values with CPU2 depending on its operation program via the data bus 13. In the figure, the selection signals of these registers 50, 51 are not illustrated but CPU2 is capable of loading data by individually designating register. The heading address of area to be designated is set to a base register 50. In the range register 51, the data indicating area size is set. Respective registers 50, 51 have the number of bits matched with the number of bits of the address signal on the address bus 12.

The access detecting circuit 7 has a plurality of exclusive NOR gates (ENOR) 70 for comparing in all bits between the area heading address set to the base register 50 and the address signal of address bus 12 based on the bit correspondence. An output of the exclusive NOR gate 70 is set to high level corresponding to the bits in which comparison result is matched. An output of the exclusive NOR gate 70 is ORed, by the OR gate 71, with the data of the range register 51 for all bits in unit of bit. All outputs of the OR gate 71 are ANDed by the AND gate 72 and the AND signal is defined as the access detecting signal CSL1. As is apparent from logical structure of the address detecting circuit 7, the bit stream of logical value 1 arranged from the least significant bit side (right direction of figure) of the range register 51 designates the address range depending on the number of bits. For example, when BR="10000000", and RR=00001111, the access detecting signal CSL1 is set to high level in the range where a value of the address bus 12 is in the range of "10000000" to "10001111". In other words, a value of range register (RR) 51, particularly a bit stream of the logical value 1 from the least significant bit side functions as a mask bit stream. However, in this structure, size of the address area to be designated is limited to a value equal to raised power of 2. When size of address area to be designated can be set freely perfectly, structure of the access detecting circuit is complicated but it is enough that both heading address and trailing address are set to the area designating circuit, the access detecting circuit is formed to compare these addresses with the address on the address bus and the access detecting signal is set enabled when these are in such address range.

Detail illustration is omitted for the other access detecting circuit 8 and area designating circuit 6 but these circuits are formed in the same manner.

Figure 2:
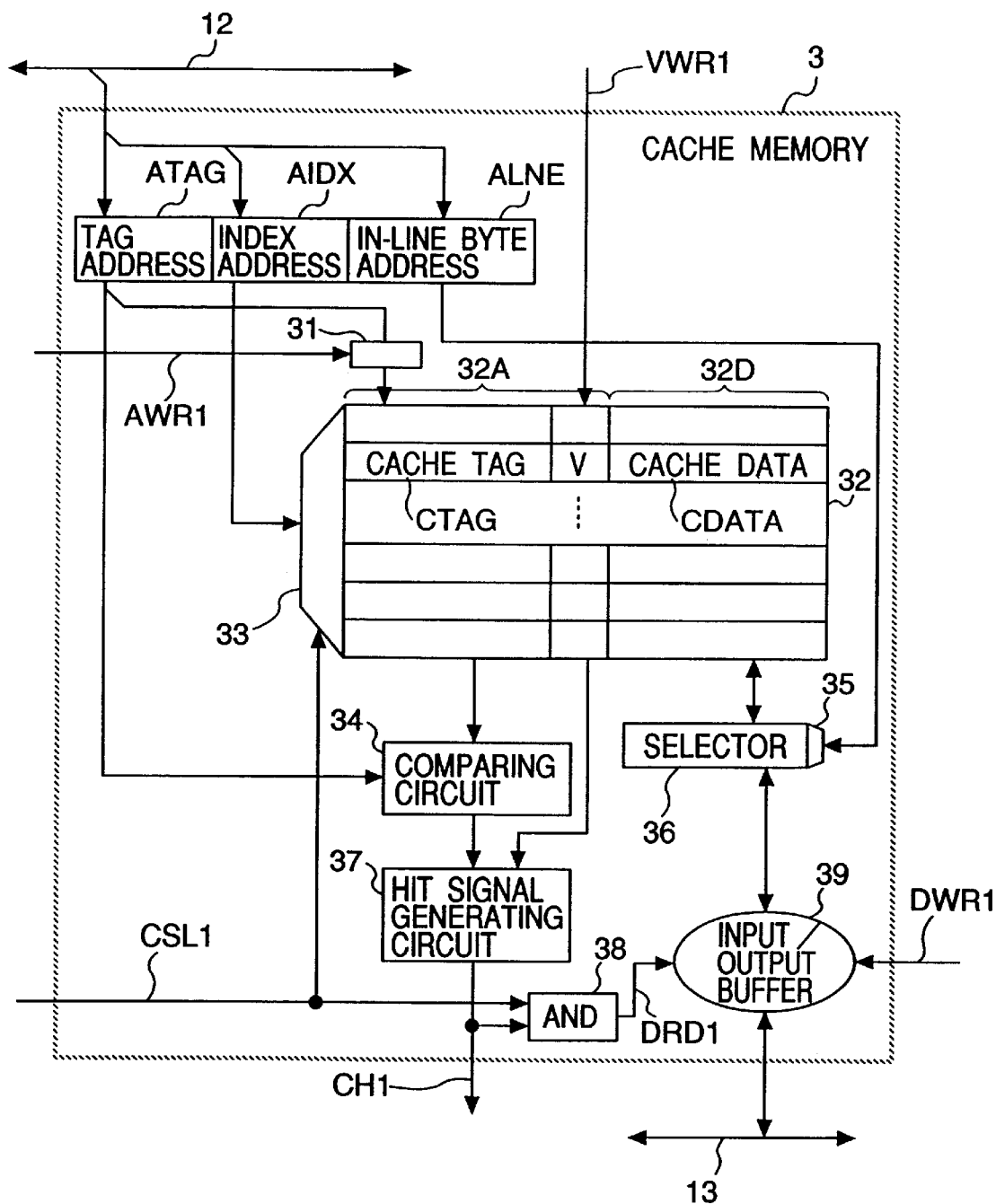
FIG. 2 is a block diagram of an example of a cache memory.

FIG. 2 illustrates an example of the cache memory 3. This cache memory 3, although not particularly restricted, is of the direct map type. The cache memory 3 is structured by including a plurality of cache lines to the memory cell array 32 consisting of the address array 32A and data array 32D. The cache line is a memory area selected by one index address (entry address) and, although not particularly restricted, stores cache tag CTAG, valid bit V and cache data CDATA of a plurality of bytes. The valid bit V indicates validity of cache line including the same and its logical value 1 indicates validity, while its logical value 0 indicates invalidity. The cache line is selected by an index decoder 33. When the address signal supplied to the address bus 12 is caused to correspond to the structure of the memory cell array 32 of the cache memory 3, it can be grasped as the tag address ATAG, index address AIDX and in-line byte address ALNE.

The index address AIDX is supplied to the index decoder 33. Thereby, the cache tag CTAG of the selected cache line is compared with the tag address ATAG in the comparing circuit 34. Comparison result is then supplied to a hit signal generating circuit 37 together with the valid bit V of the selected cache line. The hit signal generating circuit 37 determines to be cache hit and enables the cache hit signal CH1 (high level) only when the valid bit V supplied to the circuit 37 indicates validity of the relevant cache line and comparison result by the comparing circuit 34 is matched. In other cases, the cache hit signal CH1 is kept disabled (low level).

The cache data CDATA included in the selected cache line is selected by a selector 36 by decoding the in-line byte address ALNE with a byte selection decoder 35. The selector is a switch circuit which can send the data in both directions and an input/output buffer 39 is arranged between the selector and data bus 13. The access detection signal CSL1 corresponding to the cache memory 3 and the cache hit signal CH1 explained above are then supplied to a 2-input type AND gate 38, an output of this AND gate 38 is defined as a data output control signal DRD1 of the input/output buffer 39, and when the data output control signal DRD1 becomes high level, the byte data selected by the selector 36 is output from the data bus 13. As is apparent from this explanation, the cache memory 3 outputs the data in relation to hit when the corresponding access detecting circuit 7 detects access to the assigned area of the cache memory 3 and thereby the cache hit condition is attained. It is naturally possible to control output of the input/output buffer 39 only with the cache hit signal CH1. In this embodiment, the access detection signal CSL1 is also used for controlling output of the input/output buffer 39 because it is necessary to eliminate a risk of malfunction not visualized and such requirement is not essential. Moreover, the index decoder 33 is activated to perform the selecting operation when the access detection signal CSL1 is enabled. Although not particularly illustrated, the similar activation control can also be made for the comparing circuit, hit signal generating circuit and byte selecting decoder. Such control provides much contribution to realization of low power consumption of a plurality of cache memories as a whole.

The input control for the input/output buffer 39 is executed by the data input control signal DWR 1 depending on the cache filling operation by the cache controller 9. The tag address ATAG of the address signal in relation to cache mistake is supplied, via the gate 31, to the cache tag of the cache line as the object of cache filling operation. Control of the gate 31 is performed by the tag address write control signal AWR1. The valid bit V in the cache filling operation is processed by the valid bit write control signal VWR1. The control signals DWR1, AWR1, VWR1 are respectively output from the cache controller.

The other cache memories 4 are not illustrated in detail but these are also formed in the same structure as the cache memory 3. In FIG. 1, the data output control signal DRD2, data input control signal DWR2, tag address write control signal AWR2 and valid bit write control signal VWR2 for the cache memory 4 are given the sign different from that in FIG. 2, but the functions of these circuits are similar to that in FIG. 2.

Next, referring to FIG. 4 and FIG. 5, contents of control by the cache controller 9 in the cache hit and cache mistake conditions will be explained.

Figure 4:
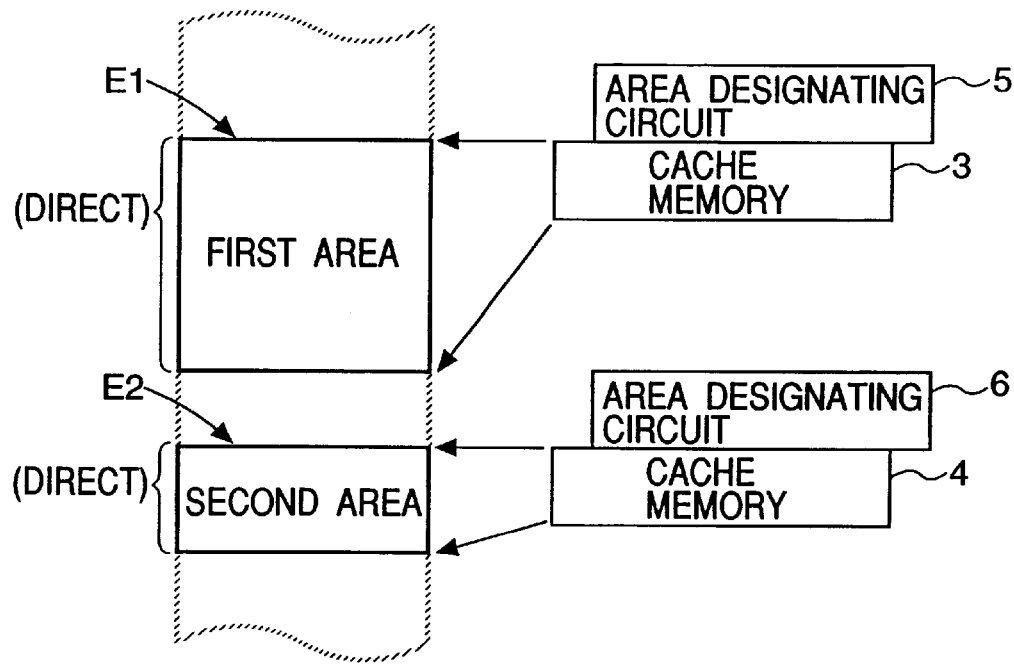
FIG. 4 is an address map showing the condition when mutually different areas are designated in a couple of area designating circuits.

FIG. 4 illustrates the address map in the case that the designation area by the area designating circuits 5, 6 is not overlapped. FIG. 5 illustrates the address map in the case that the designation area by the area designating circuits 5, 6 is overlapped. In each figure, the first area E1 is an address range designated by the area designating circuit 5 and is also defined as the address range applied to the cache memory 3 (address range as an object of cache by the cache memory 3). The second area E2 is the address range designated by the area designating circuit 6 and is also defined as the address range applied to the cache memory 4 (address range as an object of cache by the cache memory 4). The overlap area Eco is the overlap address area of the first area E1 and second area E2.

The cache controller 9 recognizes which cache memory has generated a cache mistake, depending on the conditions of the access detection signals CSL1, CSL2 and cache hit signals CH1, CH2. Access by CPU to the first area E1 and second area E2 is judged when the access detection signals CSL1, CSL2 are set to the high level. For instance, when CPU makes access to the area other than the overlap area Eco in FIG. 4 or FIG. 5, both access detection signals CSL1, CSL2 are never set to high level. When only one access detection signal CSL1 or CSL2 is set to high level, it can be recognized whether cache mistake is generated for such access by referring to the cache hit signal CH1 or CH2 corresponding to one access detection signal CSL1 or CSL2 being set to high level.

When a cache mistake is recognized as explained above, the cache controller 9 gives, to the bus controller 10, an instruction for reading the data of the address in relation to cache mistake from an external main memory 17 or the like. The data to be read should be the data corresponding to the number of bytes of the cache data section of one cache line. In actual, the burst transfer, etc. is often used for reading the data of a plurality of bytes. In this case, in-line byte address can be updated by the bus controller 9. The data to be transferred first depends on the in-line byte address ALNE when a cache mistake is generated. The bus controller 10 drives an external bus cycle responding to such instruction. Thereby, when the necessary data is enabled to be used sequentially on the data bus 13, the cache controller 9 fetches the data, with the input control signal DWR1 (or DWR2), to the cache memory in relation to a cache mistake. The data fetched is then written to the indexed cache line via the selector 36. The data written as explained above is defined as the cache data CDATA. Moreover, the tag address ATAG of the address signal in relation to cache mistake is written to the relevant cache line via the gate 31. The written tag address ATAG is defined as the cache tag CTAG.

The cache controller 9 can employ various logics for indexing a cache line (defining an object of cache filling operation) at the time of cache filling operation. For example, when the valid bit V of the cache line indexed first at the time of determining a cache mistake indicates invalid condition, such cache line may be defined as an object of the cache filling operation. When the valid bit V of the cache line indexed when a cache mistake is generated indicates the valid condition, the cache line as the object of cache filling operation can be determined depending on the random, alternate or LRU (Least Recently Used) logics. Here, it is also possible to employ the random, alternate or LRU logic without relation to a value of the valid bit V of the cache line in which a cache mistake is generated or it is also possible that the cache line in which a cache mistake is generated can be defined as the object of cache filling operation without any conditions. The LRU logic is often considered as the best logic in regard to improvement of cache hit rate.

In the case of the cache mistake generated during the read access by CPU2, when the first byte data read externally may be used on the data bus, the cache controller 9 notifies it to CPU2 in the cache filling operation. Thereby, CPU2 can read the data in relation to cache mistake.

In the case of the cache mistake generated during the write access by CPU2, although not particularly restricted, the data in relation to the relevant cache mistake is previously written to the access address in relation to the cache mistake.

Figure 5:
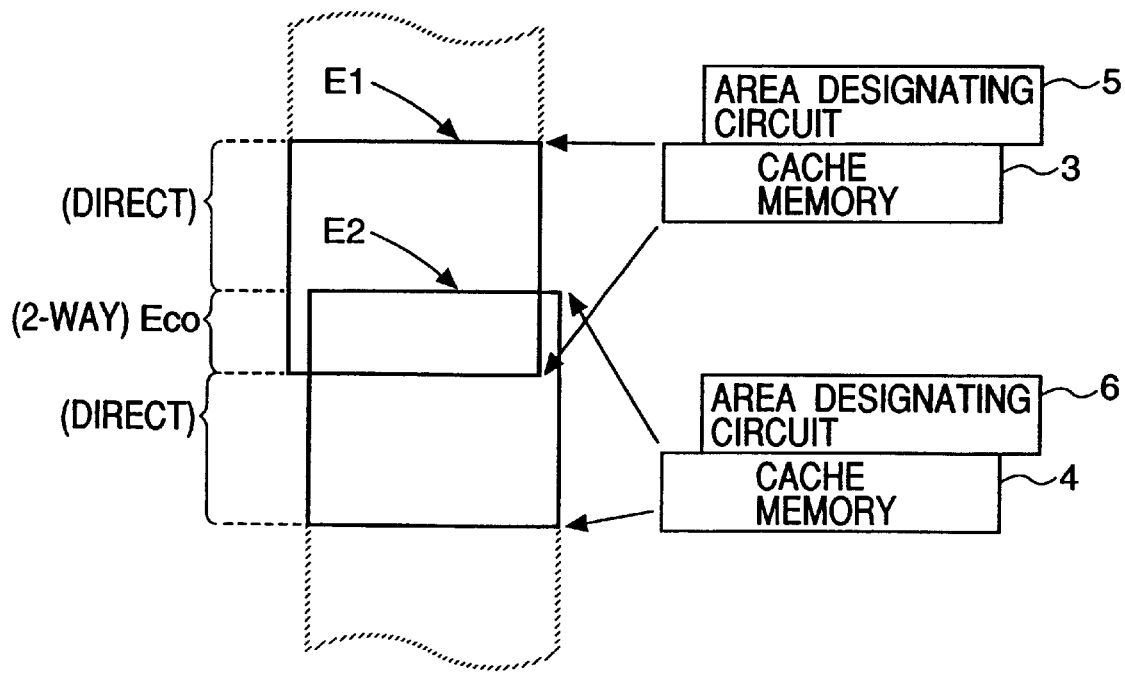
FIG. 5 is an address map showing the condition when partially overlapped areas are designated in a couple of area designating circuits.

Meanwhile, when CPU makes access to the overlap area Eco illustrated in FIG. 5, both access detection signals CSL1, CSL2 are set to high level. Namely, the index operation and cache hit/mistake determining operation are performed in both cache memories. In this case, the condition in which both cache hit signals CH1 and CH2 are in the low level is determined as the cache mistake for the overlap area Eco. When a cache mistake is determined for the overlap area Eco, which cache line of what cache memory should be considered as an object of the cache filling operation during the read access is determined, in the same manner as the case where a cache mistake is generated during the read access, depending on a value of the valid bit V of the cache line in relation to cache mistake or random, alternate or LRU logic of the cache controller 9. The other cache filling operation is not different from that explained previously. The condition where one is in the cache hit condition while the other is in the cache hit condition is determined as the cache hit condition for the overlap area Eco. Since the cache filling operation is performed only for one cache memory, the cache hit condition is never generated in both cache memories 3, 4. Data is read to the data bus 13 from one cache memory being set to the cache hit condition or the write data is written to the predetermined byte position of the cache data section CDATA.

According to the embodiment described above, following effects can be attained.

The number of cache memories employed to the data processor 1 of this embodiment can be determined freely within the range which the chip occupation area allows. Depending on the number of cache memories to be employed, logic of the cache controller 9 is a little changed. Therefore, in the case of increasing or decreasing the capacity of cache memory in order to provide the data processor 1 as a product, the designed data of the cache memories 2, 3 can be used in direct and it is not requested to newly design the predetermined cache memory from the beginning.

In addition, since it is possible to change the address range for functioning each cache memory 2, 3, the cache memory can be functioned for each address area divided, for example, for every task or a group of tasks or data area. As shown in FIG. 4, for example, the cache object area of cache memory 3, 4 can be assigned, by the area designating circuits 5, 6, for every storing area E1, E2 of the task or a group of tasks. Therefore, the condition in which cache mistake is continuously generated in regard to program and data during changeover of the task can be eliminated and data processing efficiency can be improved by extracting the capability of the cache memory to a largest extent. In other words, the structure of cache memory can be optimized depending on the property of program and data. Such process is never fixed by the hardware. Namely, the cache memory which is caused to share the program area of task may be varied depending on the setting of the area designating circuits 5, 6. Thereby, the measures for offering a product of the data processor can easily be attained.

The area designating circuits 5, 6 are respectively provided with registers RR, BR for designating location and size of address area and CPU2 can set the relevant registers RR, BR depending on the operation program thereof. According to this setting, the task for assigning cache memories 2, 3 and data block can be varied under the condition that the data processor 1 is loaded to the system or depending on the operation program executed by the software, namely CPU2.

Figure 6:
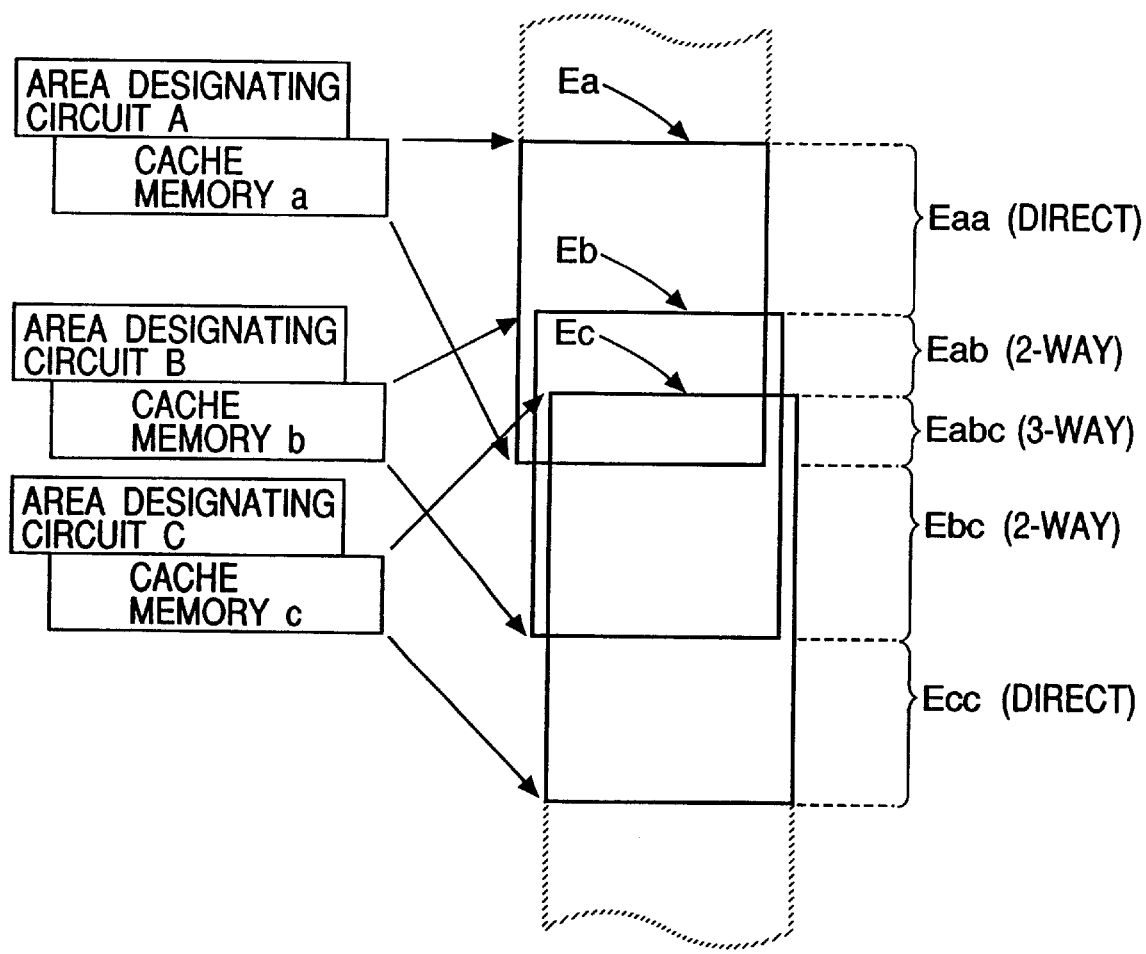
FIG. 6 is an address map showing an example of the condition when the cache object areas of three cache memories are mutually overlapped.

A plurality of area designating circuits 5, 6 are capable of designating locations of the address areas in the overlapped condition. When the cache memory 2, 3 is of the direct map type, as shown in the example of FIG. 5, a plurality of cache memories 3, 4 in which the address areas are set in overlapped condition are substantially functioning in the same manner as the 2-way set associative type cache memory in the area Eco where the address areas are overlapped. When each cache memory 2, 3 is of the n-way set associative type, a couple of cache memories 2, 3 in which the address areas are set in the overlapped manner are functioning substantially in the same manner as the 2n-way set associative type cache memory in the area where the address areas are overlapped. In addition, as illustrated in FIG. 6, when the cache object areas Ea, Eb, Ec of the cache memories a to b of three direct maps similar to the cache memories 3, 4 are partially overlapped in the respective area designating circuits A to C, the area Eabc functions as the 3-way set associative type, while the areas Eab and Ebc function as the 2-way set associative type. The areas Eaa, Ecc function as the direct map type.

As explained above, when the area is designated in such a manner that the address areas are partially overlapped, functions of a plurality of cache memories can be changed to improve the cache hit condition. Moreover, such function can also be determined by the software as explained above. The operation program in the data processor for device comprising control can previously determine or judge that the necessary data processing capability can be obtained by allocating which processing routine to which address area and then executing such routine with what processing speed. Therefore, one address area is designated to the cache object area common to a plurality of cache memories in addition to the assignment of cache object area for a plurality of cache memories and a plurality of cache memories are totally caused to operate as the set associative caches. Accordingly, the cache hit rate can be improved for the task which requires higher operation rate or the data.

The cache controller 9 performs, to one cache memory, the cache filling operation for adding the data regarding a cache mistake to the cache line as the new entry when a cache mistake occurs. Therefore, even when area designation is overlapped for a plurality of cache memories, the cache hit condition determined in individual cache memory is exclusively attained in one cache memory. A plurality of cache memories do not determine in parallel the cache hit condition.

When one access detecting circuit has detected access by CPU2 to the designated address area, if a cache memory corresponding to such detecting circuit generates a cache mistake, the cache controller 9 performs the cache filling operation for the cache memory corresponding to such detecting circuit. Moreover, when a plurality of access detecting circuits have detected access by CPU2 to the designated address area, if all cache memories corresponding to such detecting circuits generate a cache mistake, the cache controller performs the cache filling operation to any one cache memory.

Power consumption required by cache line selecting operation can be reduced for a plurality of cache memories as a whole by enabling the indexing operation and cache hit/mistake determining operation of cache memories 2, 3 when the corresponding access detecting circuits 7, 8 have detected access to the designated address area.

The inventions by the inventors of the present invention have been described on the basis of the preferred embodiments thereof, but the present invention is not limited thereto and it is apparent that the present invention may be varied or modified as required without departure from the scope of the claims.

For example, the cache memory may be structured to separate the data cache memory and instruction cache memory or may be structured as a unified cache memory allowing co-existence of instruction and data. The structure to be employed is determined by the area designation. Moreover, individual cache memory is not limited to the direct map type and may be the set associative type totally or partially. In addition, the number of cache memories is not limited to two or three and it is also possible to employ the desired number 4 or more.

The area designating circuit is not limited to the structure including a register to be accessed by CPU and can employ the structure to set the area via external terminal. Moreover, the access detecting means is not limited to the structure explained above and can be varied as required. The circuit module included in the data processor is not limited to the embodiment described above and it allows addition or deletion of the other circuits as required. Furthermore, the area designating means is not limited to the structure for designating linearly to designate the address area as described in the embodiment and it also allows introduction of the structure which can designate the address areas with an adequate interval.

INDUSTRIAL APPLICABILITY

As explained previously, the data processor of the present invention can be applied widely to the field, for example, of the device comprising control and more practical to digital camera, game machine, hand-held communication terminal and hand-held information terminal or the like.

What is claimed is:

1. A data processor comprising:
   a central processing unit;
   a plurality of area designating units for variably designating location and size of an address area in a memory space managed by the central processing unit;
   a plurality of detecting units for detecting access by the central processing unit to the designated address area;
   a plurality of cache memories coupled with the central processing unit via an internal bus and provided individually corresponding to a plurality of the detecting units for outputting the data in relation to hit to the internal bus depending on a cache hit condition; and
   a cache control unit for controlling a cache filling operation for a cache mistake to one cache memory on the basis of a cache hit/mistake determination result in the cache memory and detecting the result by the access detecting units;
   wherein the cache memories include at least a first cache memory and a second cache memory;
   wherein the first cache memory is capable of caching a first address area including a first area and a second area, and the second cache memory is capable of caching a second address area including the second area and a third area;
   wherein one of the area designating units corresponding to said first cache memory is able to designate a location of said first address area and another one of the area designating units corresponding to the second cache memory is able to designate a location of said second address area;
   wherein said first address area and said second address area are overlapped by said second area;
   wherein each of the detecting units is detectable access of the central processing unit for address area; and
   wherein said cache control unit controls said at least one of cache memory corresponding to address area accessed by the central processing unit.

2. A data processor as claimed in claim 1, wherein said area designating unit is provided with a register unit for designating location and size of address area and the register unit is accessed by the central processing unit.

3. A data processor as claimed in claim 1, wherein a plurality of the area designating units are capable of designating the locations of the address areas in an overlapping manner.

4. A data processor as claimed in claim 3, wherein when one detecting unit has detected access by the central processing unit to the designated address area, if the cache memory corresponding to the detecting unit generates the cache mistake, the cache control unit performs the cache filling operation for the cache memory corresponding to the detecting unit.

5. A data processor as claimed in claim 3, wherein when a plurality of the detecting units have detected an access by the central processing unit to the designated address area, if all cache memories corresponding to detecting units have generated the cache mistake, the cache control unit performs the cache filling operation for any one cache memory.

6. A data processor as claimed in claim 3, wherein the cache memory is capable of executing the indexing operation and cache hit/mistake determining operation when the corresponding detecting unit has detected access to the designated address area.

7. A data processor as claimed in claim 6, wherein the cache memory is provided with a buffer unit for outputting data to the data section of cache line in relation to hit condition to the internal bus when the indexing operation and cache hit/mistake determining operation are enabled and the cache hit/mistake determining result is cache hit.

8. A data processor as claimed in claim 1, wherein an external bus interface unit is coupled with the internal bus and is formed on one semiconductor substrate.

9. A data processing system comprising a data processor as claimed in claim 8, including an external bus connected to the external bus interface unit of the data processor and a memory connected to the external bus.

10. A data processor as claimed in claim 3, wherein the cache control unit is arranged to control a plurality of the cache memories if the detecting units detect the access for an overlapped address area.

11. A data processor comprising:
    a central processing unit;
    a plurality of area designating units for designating location and size of an address area in the memory space managed by the central processing unit;
    a plurality of detecting units provided corresponding to respective area designating units for detecting access by the central processing unit to the address area designated by the area designating units; and
    a plurality of cache memories coupled with the central processing unit via an internal bus and provided individually corresponding to a plurality of the detecting units,
    wherein the plurality of cache memories include first and second direct map cache memories, the area designating units corresponding to the first and second direct map cache memories are partially overlapped in the locations of the mutually designated address areas, and the first and second direct map cache memories are combined as one set associative cache memory in the overlapping area of the designated address area.

12. A data processor comprising:

a central processing unit;

a plurality of area designating units for designating location and size of address area in the memory space managed by said central processing unit;

a plurality of detecting units provided corresponding to respective area designating units for detecting access by the central processing unit to the address area designated by said area designating units; and a plurality of cache memories coupled with the central processing unit via an internal bus and provided individually corresponding to a plurality of the detecting units;

wherein the plurality of cache memories include first, second and third direct map cache memories, the area designating units corresponding to the first, second and third direct map cache memories are partially overlapped in the location of the mutually designated address areas, and the first, second and third direct map cache memories are combined to one set associative cache memory in the overlapped areas of the designated address area.

* * * * *